(12) United States Patent
Obst et al.

(10) Patent No.: US 9,167,629 B2
(45) Date of Patent: Oct. 20, 2015

(54) ELECTRIC HEATER

(75) Inventors: Andreas Obst, Kandel (DE); Jan Aichele, Vaihingen/Enz (DE)

(73) Assignee: DBK DAVID + BAADER GmbH, Kandel (DE)

( * ) Notice: Subject to any disclaimer, the term of this patent is extended or adjusted under 35 U.S.C. 154(b) by 676 days.

(21) Appl. No.: 13/499,165

(22) PCT Filed: Nov. 9, 2010

(86) PCT No.: PCT/EP2010/067137
§ 371 (c)(1),
(2), (4) Date: Jun. 28, 2012

(87) PCT Pub. No.: WO2011/054970
PCT Pub. Date: May 12, 2011

(65) Prior Publication Data
US 2012/0315024 A1     Dec. 13, 2012

(30) Foreign Application Priority Data
Nov. 9, 2009  (DE) .......................... 10 2009 052 384

(51) Int. Cl.
| | |
|---|---|
| *B67D 7/80* | (2010.01) |
| *H05B 3/48* | (2006.01) |
| *B60H 1/22* | (2006.01) |
| *F24H 1/00* | (2006.01) |
| *F24H 1/12* | (2006.01) |
| *F24H 9/20* | (2006.01) |

(52) U.S. Cl.
CPC ................ *H05B 3/48* (2013.01); *B60H 1/2221* (2013.01); *F24H 1/009* (2013.01); *F24H 1/121* (2013.01); *F24H 9/2028* (2013.01)

(58) Field of Classification Search
CPC ....... B60H 1/2221; F24H 1/009; F24H 1/121; F24H 9/2028; H05B 3/48; F02M 31/125; F02M 31/16
USPC ........................................................ 392/465
See application file for complete search history.

(56) References Cited

U.S. PATENT DOCUMENTS

| | | | |
|---|---|---|---|
| 4,512,324 | A | 4/1985 | Neary |
| 6,673,378 | B1 | 1/2004 | Fritz |

FOREIGN PATENT DOCUMENTS

| | | | |
|---|---|---|---|
| DE | 19 642 442 A1 | | 4/1998 |
| EP | 0 481 842 A2 | | 4/1992 |
| EP | 0481842 | * | 4/1992 |
| EP | 1 813 453 A1 | | 8/2007 |

* cited by examiner

*Primary Examiner* — Shawntina Fuqua
(74) *Attorney, Agent, or Firm* — Oblon, McClelland, Maier & Neustadt, L.L.P.

(57) ABSTRACT

The invention relates to an electric heater comprising a fluid-conducting housing, in which at least one, preferably helical, heating unit, preferably a wire resistance heating element, is accommodated. The heating unit can have a tubular outer body, in which a heating element electrically contacted with a control circuit accommodated in an electronics housing is embedded. According to the invention, end sections of the heating unit extend in a sealed manner through the fluid-conducting housing to, and preferably into, an electronics housing. The invention further discloses a method for actuating an electric heater and to a heater that can be operated according to such a method, wherein said heater is designed with at least one resistance heating element, which acts as a temperature sensor, so that the temperature thereof can be used for actuating the heater.

12 Claims, 8 Drawing Sheets

ELECTRIC HEATER

BACKGROUND OF THE INVENTION

1. Field of the Invention

The present invention relates to an electric heater (or else an auxiliary heater) for heating fluids in vehicles.

2. Discussion of the Background

Heaters, in particular heating, systems of this species, are required in vehicles, especially in cars, for various applications, such as for heating (warming up) the ambient air in the passenger compartment, for preheating the cooling water of water-cooled engines, for pre-glowing the spark plugs in self-igniting internal combustion engines, for heating fuel (diesel fuel) etc.

Heating systems of this type usually comprise a heating having at least one heating stage each including at least one heating element (for instance in the form of a heat resistor) for generating a particular heating capacity as well as a control unit for monitoring and/or controlling the time course and for presetting the heating capacity.

Especially in modern vehicles using high electric voltages in their electrical system, such as electrically operated vehicles, hybrid vehicles or fuel cell vehicles, fluid circulation systems must be heated due to missing or only temporarily available heat sources such as an internal combustion engine. These are usually water circulation systems that serve for heating the interior of the passenger compartment of a vehicle or for heating driving components such as the battery.

Since the engine waste heat is not or only temporarily available as a heat supply in these vehicles (or, respectively, discharges heat only to a restricted extent, as in the case of hybrid vehicles, for example), additional heating systems must be provided. For this purpose, especially electric heating systems are an option, as they are known from the state of the art, for instance according to DE 19 642 442 A1.

This known system must be adapted, however, when employed in modern vehicles especially having alternative drives, to the use of the high electrical system voltage common in those vehicles (maximum 500 volt). The system must in addition be electrically safe, i.e. it should have a high breakdown voltage, for example. Moreover the system should be controllable, thus absolutely requiring the use of electronics. Furthermore high mechanical stability is necessary, as during operation such system is exposed to a high vibration load and should remain safe also in the case of crash. What is decisive in this context is that a voltage transmission to the car body endangering the vehicle occupants is avoided in each common and extraordinary operating state.

It is basically known in the state of the art, especially in a car, to build in a cooling water heater. Among other things, also so called fuel heaters are offered which burn fuels and transmit the heat in a heat exchanger to the cooling water. At the end of the 90 s, however, electric cooling water heaters as described among other things in the afore-mentioned state of the art became established. This system which is equipped already with a safety concept for avoiding voltage transmissions to the car body is adapted to the electrical system voltage of a conventional car, however, and therefore functions only with low voltage of e.g. 12 V or 24 V, Moreover, from the state of the art a tubular heating unit (RHK) is known as electric heating element which is designed to be adjusted to a final voltage of 230 V (or 400 V). Those tubular heating units are not prepared to being used in a vehicle and especially in a car, however.

SUMMARY OF THE INVENTION

In view of this state of the art, the object underlying the invention is to provide a simply structured heater suited for high operating voltages which is adapted to be mounted in vehicles and especially cars of preferably modern design.

This object is achieved by a heater (also understood to be an auxiliary heater) having features disclosed herein.

The electric heater of a vehicle according to the invention consequently includes a fluid-guiding housing in which at least one preferably helical heating unit, further preferably a (wire) resistance heating element is accommodated. Furthermore the end sections of the at least one heating unit are guided preferably in a sealing or sealed manner through the fluid-guiding housing to and preferably into an electronics housing in which a control circuit for the heating unit is accommodated. Thus it is achieved that the electric terminals at the heating unit are located in a protected manner inside the electronics housing and are electrically insulated.

The heating unit preferably includes a tubular outer body in which a heating element electrically contacted with the control circuit accommodated in the electronics housing is embedded so that between the outer body and the heating element an (annular) clearance is formed that is filled with an insulator. In accordance with the invention, the outer diameter of the heating element is substantially smaller than the inner diameter of the outer body. Hereby an electric breakdown of the voltage at the heating coil to the outer body can be safely avoided even in the case of crash.

Further preferably the heating unit is supported by holding elements on the fluid-guiding housing at the inside and/or peripheral side as well as in flow-around direction and is stabilized thereby. The holding elements can further be formed as flow baffles preferably for swirling the fluid flowing through or can support appropriate flow baffles. The holding elements are adapted to be made of metallic material and/or plastic material.

In accordance with another aspect of the invention, the electronics housing is held by a support preferably in the form of tabs or strips of steel, aluminum or a plastic material at the housing through which fluid flows, the support also forming a fastening means of the heater for mounting on a supporting member. The tabs or strips thus form a preferably lateral protection for the electronics housing. Furthermore the electronics housing in this mounting concept is necessarily located between the fluid-guiding housing and the supporting member (body part of the vehicle) and is thus shielded against external influences by the fluid-guiding housing.

Finally the fluid-guiding housing according to another aspect of the invention includes a shell member supporting the heating element and being preferably groove-shaped as well as two front-end housing end portions each having a fluid inlet or fluid outlet. This structure can easily be manufactured and the at least one heating unit is adapted to be easily mounted in the housing, because the housing can be composed of said four parts quasi around the at least one heating unit.

It is noted that the housing can basically be made of metal and/or of plastic material. It is also possible to arrange the inlet and the outlet of the housing at opposing housing end portions or at the same housing end portion, wherein in the latter case the housing consists of two telescoped partial housings so that in the inner partial housing a first flow direction is formed which is transformed into an opposite flow direction between the inner and outer partial housings.

The electric heater driven by the method according to the invention has a power electronics through which at least one heating circuit is driven. This heating circuit includes a resistance heating element which is in contact with the power electronics. In accordance with the invention, in the data memory of the power electronics a resistance-temperature characteristic curve of the resistance heating element is stored.

During operation of the heater the resistance of the resistance heating element is established, for example by, measuring the current intensity at a predetermined voltage, and in response to said currently established resistance the actual temperature is read out through the characteristic curve. The electric power is then modulated via the power electronics in response to said actual temperature and where appropriate, the heater or a heating circuit is switched off when a maximum temperature is exceeded. I.e. according to the method according to the invention, power modulation is performed in response to the temperature established through the characteristic curve.

Accordingly, the electric heater according to the invention is configured to include power electronics through which at least one heating circuit can be controlled. The latter includes a resistance heating element having a resistance-temperature characteristic curve approximately linear within the operating temperature range which is in electric contact with the power electronics. The latter includes a data memory for storing the characteristic curve and is designed so that an actual resistance of the resistance heating element is established and in response to said actual resistance, an actual temperature can be read out of the data memory and the resistance heating element is then controlled in response to said actual temperature.

By this method according to the invention and the corresponding heater an extremely inexpensive temperature monitoring can be realized practically without any additional components, an advantage residing in the fact that the entire resistance heating element itself acts as temperature sensor and thus also an integral temperature determination is permitted. The temperature signal obtained in accordance with the method according to the invention can then be employed to control the heater, for instance to switch off the entire heater or to disconnect individual heating circuits or for power modulation.

In a variant of the invention it is assumed that the characteristic curve in the operating temperature range extends approximately linearly so that the detection of the characteristic curve is facilitated. On principle, it is also possible, as a matter of course, to take an exact characteristic curve having a non-linear course as a basis.

With a linear characteristic curve the calibration before putting the heater into operation is relatively simple, because with predetermined reference temperatures, for example, each of the resulting resistances is measured and then the characteristic gradient is calculated on the basis of the resistance/temperature values and the assumption, of an approximately linear course of the characteristic curve.

Calibration is even simpler if it is assumed that the gradient of the characteristic curve of the resistor material remains constant even in the case of manufacturing and material variations and the respective characteristic curves are merely shifted in parallel in response to material and manufacturing variations. In this case it is sufficient to perform one single measurement with a predetermined reference temperature and to determine the position of the characteristic curve with a predetermined gradient on the basis of the then resulting observational pair (resistance, temperature).

In the heater according to the invention a control element of the power electronics for switching or controlling the resistance heating element can also be designed for measuring the current intensity so that with a predetermined operating voltage (low voltage approx. 13.5 V, high voltage between 192 V and 450 V) and on the basis of the measured current intensity the actual resistance of the resistance heating element can be established.

BRIEF DESCRIPTION OF THE DRAWINGS

The invention will be explained hereinafter in detail by way of preferred embodiments with reference to the accompanying figures.

Each of FIGS. 1 and 2 shows a lower perspective view of a heater (or auxiliary heater) designed as a water heater including attached electronics housing according to a first preferred embodiment of the invention.

DETAILED DESCRIPTION OF THE PREFERRED EMBODIMENTS

The heater 1 (or auxiliary heater) according to the first preferred embodiment of the invention (hereinafter also referred to water heater WH) is prepared for mounting in the circulation of an operating fluid, e.g. cooling water, of a vehicle. The water heater 1 therefore consists of a tubular or cylindrical housing 2 preferably made up of two shells having an initial area and an end area 4, 6. Each of the initial and end areas 4, 6 of the housing 2 forms a cup-shaped cover lid (fluid connections) in each of which a connection 8 is formed corresponding to an inlet and an outlet. It is also possible that the connections 8 are screwed, welded or soldered to the cover lids as separate (individual) components. The connections 8 can also be formed integrally with the cover lids. These four components (i.e. the two half shells 10, 12 preferably adapted to be joined to one cylinder (or simply pipe connection) as well as the two cover lids 4, 6 arranged at the initial and end areas of the housing 2 are made, for example, of stainless steel or aluminum and can be welded together after mounting a heating means 14 to form an overall housing 2. The half shells 10, 12 can preferably be fabricated as metal stampings which are optionally stiffened in the present case by longitudinally extending reinforcing ribs, strips or sheets 15 evenly spaced in circumferential direction. As an alternative to this, it is also possible, however, to fabricate the half shells 10, 12 of a different material, such as plastic material or a metal-plastics compound. Also, the afore-described cylindrical shape is not compulsory but can also be replaced with a type of "tub including cover", i.e. a semi-circular shape, a rectangular shape or any other suitable cross-sectional shape.

As a heating means 14 in the present case at least one electric heater is provided which is in the form of a so called tubular heating unit 16 (hereinafter also referred to as RHK). Such RHK 16 substantially consists of a tubular outer body 18 (having a diameter of approx. 8 to 10 mm) in which a heating element, i.e. a heating coil 20 (having a diameter of approx. 4 mm) of suitable heat conductor material (also referred to as wire resistance heating element) is centrally introduced. A space having the shape of an annular gap remaining between the outer body (tubular body) 18 and the heating, coil 20 is filled with an electrically insulating material. Said insulating material usually consists of magnesium oxide and is also referred to as "MgO" to simplify matters.

At the axial ends 22, 24 of the (wire) heating coil 20 (i.e. at the outlet from the tubular outer body 18) appropriate connecting elements are arranged for connection to an electric power circuit (not shown in detail). Moreover, the tubular outer body 18 is tightly closed at its axial ends, thereby also the clearance in the form of an annular gap being sealed. The tubular heating unit (RHK) 16 manufactured in this way can optionally be brought into almost any shape by bending. In the present case, the RHK 16 is brought into a preferably helical shape for use in the water heater 1, wherein also a zigzag shape or a wave/loop shape is imaginable, however. The axial ends 26, 28 of the RHK 16 extend in a spatial direction which is aligned, when mounting the at least one RHK (tubular heating unit) 16 in the preferably tubular or cylindrical fluid-guiding housing 2, in a direction (substantially) radial relative thereto.

Concretely speaking, the preferably tubular or cylindrical fluid-guiding housing 2 is formed in the area of the welded half shells 10, 12 to have a number of axially spaced through bore rows each consisting of two through bores 30, 32 (on the jacket side), wherein through each pair of through bores the two axial ends 26, 28 of a respective RHK (tubular heating unit) 16 are guided. The through orifices 30, 32 are further sealed by appropriate sealing elements (not shown) in a fluid tight manner. Moreover, at the preferably tubular or cylindrical housing 2 in the area of the through orifices 30, 32 a number of mounting feet or tabs 34 are attached, preferably welded, to which the housing 36 of control electronics is fixed or fixable such that the free ends 26, 28 of the respective tubular heating units 16 substantially radially protruding from the cylindrical housing 2 of the water heater project to and preferably into the housing 36 of the control electronics. In this way, the free ends 26, 28 of the respective RHK are electrically insulated by the housing 36 of the electronics.

In this context, it is referred to the fact that it is necessary for the use of the RHK (tubular heating units) 16 at high operating voltages and especially for attaining a high breakdown voltage required for the operation in vehicles to enlarge the (radial) insulating distance provided by the insulator "MgO" compared to the water heaters known from the state of the art so as to realize operating voltages of up to 500 V. Since the outer diameter of the outer body 18 usually shall or cannot be enlarged, the heating coil 20 inside the tubular outer body 18 is reduced to a diameter amounting to less than half of the inner diameter of the outer body 18.

Furthermore, for representing plural heating circuits and plural heating stages, respectively, several of the RHK (tubular heating units) 16 can be positioned one behind the other (serially) along the preferably cylindrical housing 2. Each of said tubular heating units 16 and of its free ends 26, 28, respectively, protrudes outwardly through a respective pair of orifices (on the jacket side) in the cylindrical housing 2 with corresponding seals at the orifices.

Figure 1:
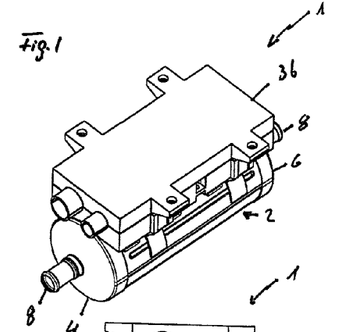
Figure 2:
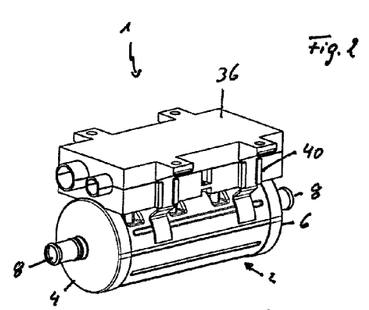
Figure 3:
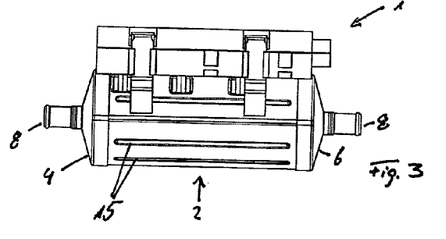
FIG. 3 shows the heater according to the invention including electronics housing in a longitudinal view.
Figure 4:
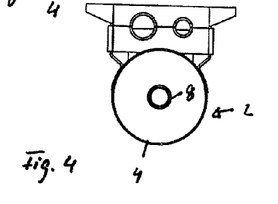
FIG. 4 shows the heater according to the invention including electronics housing in a front view.
Figure 5:
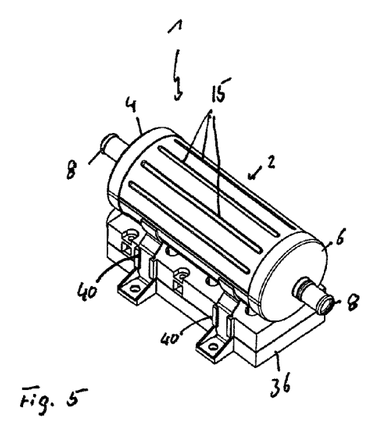
FIG. 5 shows the heater according to the invention including electronics housing in a first upper perspective view.
Figure 6:
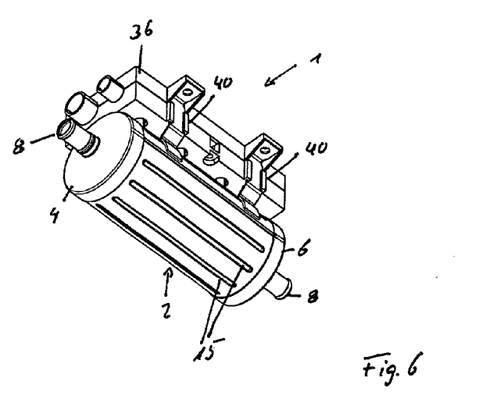
FIG. 6 shows the heater according to the invention including electronics housing in a second upper perspective view, each of FIGS. 7 and 8 shows a perspective view of the heater in the form of a water heater without electronics housing according to the first preferred embodiment of the invention.
Figure 7:
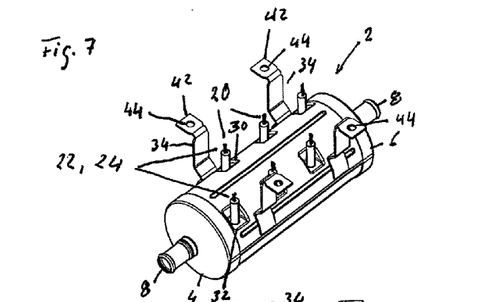
Figure 8:
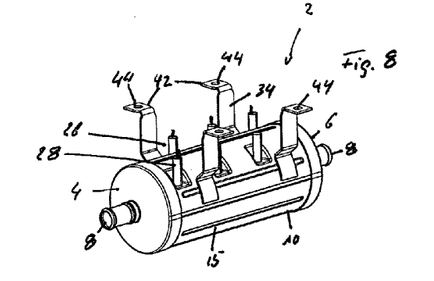
Figures 9, 10:
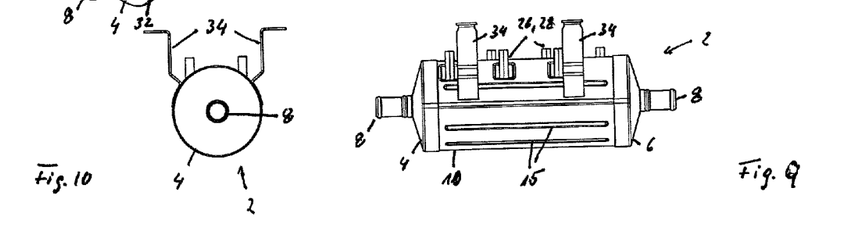
FIG. 9 shows the heater according to the invention without electronics housing in a longitudinal view.
FIG. 10 shows the heater according to the invention without electronics housing in a front view.
Figure 11:
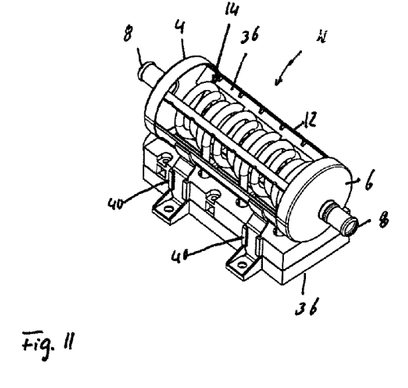
FIG. 11 shows the heater according to the invention including electronics housing in a first partially broken perspective view.
Figure 12:
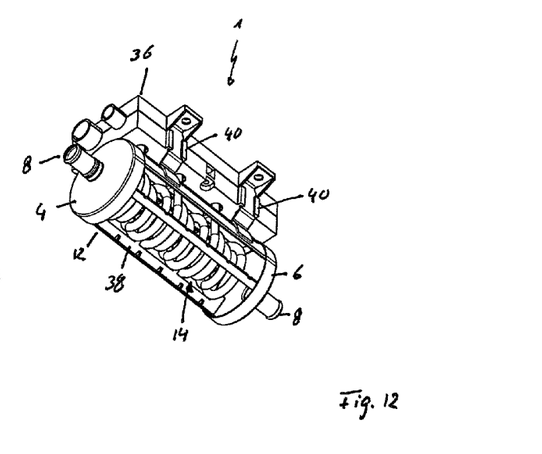
FIG. 12 shows the heater according to the invention including electronics housing in a second partially broken perspective view.
Figure 13:
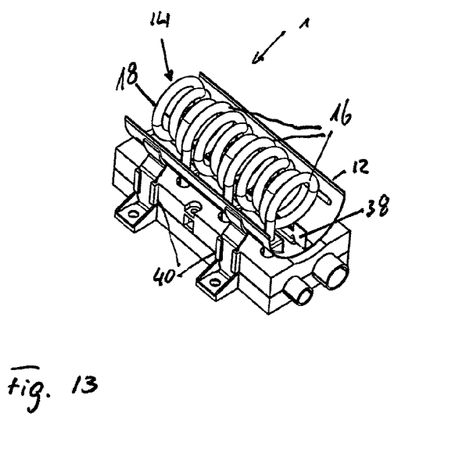
FIGS. 13 and 14 show the heater including electronics housing in a partially broken perspective view without a front-side cover lid.
Figure 14:
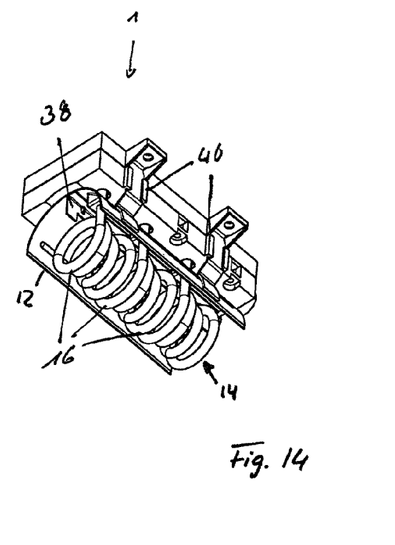

In order to fixedly support the RHK (tubular heating units) 16 inside the preferably cylindrical housing 2 a number of holding elements 38, as they are shown according to the first preferred embodiment in FIGS. 5 and 6, is provided inside the housing 2. Accordingly, the holding elements 38 of this embodiment consist of the same material as the housing 2 of the water heater and in this way can be welded into the half shells 10, 12 of the cylindrical housing 2 or can be formed integrally with the half shells 10, 12. As an alternative to this, it is also possible, however, to manufacture the holding elements of plastic material and, glue the same into the half shells 10, 12, for instance.

In the present case, the holding elements 38 are sheets, strips or rails extending along the housing 2 (preferably 3 rails arranged each to be offset by 120° in the housing 2) in which grooves or notches are formed which are in positive (local) engagement with the helically bent RHK (tubular heating units) 16. Said holding elements 38 moreover have the secondary function of swirling the fluid flowing through the housing 2 so as to ensure better heat transfer and absorption of thermal energy in the fluid. Preferably, for this purpose additional swirling elements (not shown) can be arranged or formed at the holding elements 38 in the form of wings or undercuts. As an alternative or in addition to that, it is also possible to design the holding elements 38 per se as flow baffles preferably for swirling the fluid flow within the housing 2.

As already discussed in the foregoing, the free ends 26, 28 of the at least one RHK (tubular heating unit) 16 are guided in a sealed manner preferably radially outwardly out of the tubular housing through the associated pair of orifices (on the jacket side). This seal can be provided, for instance, as a solder sleeve.

According to FIGS. 5 and 6, the further housing 36 accommodating the power electronics of the water heater according to the invention is flanged to the fluid-guiding housing 2 (on the jacket side). This mounting of the electronics housing 36 on the fluid-guiding housing 2 is carried out via said tab-shaped mounting feet 34 (supports) which are welded, soldered or riveted to the fluid or water guiding housing 2 and extend substantially in the direction of the free ends 26, 28 of the tubular heating units 16 projecting from the housing 2. Each of the mounting feet 34 engages in guides 40 of the electronics housing 36 that are formed on the side of the electronics housing 36 and thus permit attaching the electronics housing 36 to the fluid-guiding housing 2. During such attaching operation simultaneously also the free ends 26, 28 of the tubular heating units 16 protruding from the fluid-guiding housing 2 in a fluid-tight manner (as well as radially) penetrate corresponding through bores (not shown in detail) of the electronics housing 36.

The supports 34 also have a second function, however. Apart from the discussed support of the electronics housing 36 on the fluid-guiding housing 2, they also constitute the supports at the vehicle. To this end, each of the tab-shaped support elements 34 is bent at right angles at each of their freely protruding end portions and in this way forms ground contact feet 42 in each of which a through bore 44 for receiving a fastening screw not shown is formed. It is obtained by this connection by means of the tab-shaped support elements 34 according to the invention that the high-current electronics is located to be constantly protected between the fluid-guiding housing 2 and the vehicle structure (for example the vehicle body) to which the water heater is screwed. Moreover, the electronics housing 36 is enclosed on both sides, by the tab-shaped support elements 34 and is thus stiffened. In a case of crash, therefore first the fluid-guiding housing is hit and is possibly deformed while energy is absorbed, before the electronics housing 36 is involved in the collision. In this way open electric voltages can be prevented from being applied to the vehicle body during a situation of accident.

Finally, the supports 34 still have a third function. It has turned out in tests that a potential equalization is required for the electronics which should rest on the potential of the vehicle (vehicle ground). Then said potential equalization can be used as insulation controller with the aid of which an insulation fault in the high-voltage electric circuit is safely detected. It is advantageous (necessary) in this context to provide a low-resistance connection between the housing and the vehicle body. According to the invention, the supports 34 constitute/provide this potential equalization.

As already discussed in the foregoing, in the mounted state the free ends 26, 28 of the at least one RHK (tubular heating unit) 16 protrude into the electronics housing 36 usually made of plastic material. These penetration areas (through orifices 30, 32) are sealed against the fluid chamber by appropriate sealing means, for example. The free ends 26, 28 of the at least one RHK (tubular heating unit) 16 are finally directly connected, for instance by soldering, to the control electronics mounted in the electronics housing 36.

The control electronics is furthermore equipped with several safety means, as they are briefly listed in the following:

The connections of the tubular heating units 16 (or the helical heating elements 20) to the electronics are made, as already discussed, inside the electronics housing 36 preferably by directly soldering the free ends 26, 28 of the at least one tubular heating unit 16 to an electric printed circuit board, for instance. In this way, the electric contacts between the tubular heating unit 16 and the electronics of the electronics housing 36 are protected against thermal, corrosive and/or mechanical influences. The connections of supply wires not shown for the electronics are also accommodated in the electronics housing 36 and are thus likewise protected from damage.

The electronics is further structured to have a so called intrinsically safe design (redundancy) so as to reduce or to avoid failure malfunctions. It exhibits a protection against overheating, as a matter of course, in particular for the case that no fluid (medium to be heated) is provided in the heater. Consequently, the electronics is also equipped with a temperature monitoring function of a temperature sensor arranged in the medium (fluid), for instance. Since the arrangement of the temperature sensor in the fluid may possibly entail problems of tightness, it is also possible, as an alternative, to monitor the temperature by measuring the temperature at the RHK (tubular heating, unit) or at the free ends 26, 28 thereof inside the electronics housing 36. This has the further advantage that the temperature sensor and the electric wires leading to the same are protected by the electronics housing 36.

Preferably the temperature is sensed (detected) (for instance at the inlet and outlet of the housing 2) by means of NTC sensors, for instance, which are positioned in appropriate housings in the fluid flow, The detecting signals are transmitted to the control electronics through a signal wire which is guided out of the fluid chamber (inside the housing 2) preferably in radial direction while being embedded and sealed in a tube. The ends of the signal wire are soldered with the electronics. It may furthermore be provided that both temperature sensors are guided through only one penetration area (one single orifice in the housing 2) so as to save especially another sealing position, wherein also two penetration areas are possible in the housing 2, as a matter of course.

Furthermore, the electronics can be protected either passively against external temperature influence by appropriate thermal insulation of the electronics housing 36 and/or an active cooling of the electronics is performed, for instance via suitable cooling members (by convection). As an alternative or in addition hereto, cooling can also be carried out via cooling ribs that are (thermally) connected to the fluid-guiding housing 2 so as to transmit thermal energy into the housing 2.

The concept of an electric heater according to the invention, especially of a water heater, exhibits a number of advantages vis-à-vis the known state of the art, as they are listed hereinafter:

The heater according to the invention (including its control electronics) has a relatively compact structure as the fluid-guiding housing 2, the fastening and mounting tabs 34 enclosing the electronics housing 36 and the electronics housing 36 itself into which the free ends 26, 28 of the at least one tubular heating unit 16 protrude are joined to form a combination of components and thus little clearance is left between the individual components.

Moreover, this concept of assembly provides for an increased safety, for instance in the case of crash, because the support tabs 34 act to stiffen the electronics housing 36.

An increased fatigue strength is obtained especially due to the supporting or mounting tabs 34 which laterally support the electronics housing 36 preferably consisting of plastic material.

Especially the fluid-guiding housing 2 is easy to manufacture by the design of the two half-shell elements 10, 12.

The cooling of the electronics is carried out efficiently by direct heat introduction to the fluid or water-guiding housing, where appropriate.

The heating system including the constructional features according to the invention can represent a power of typically 5 kW to 8 kW.

Figure 15:
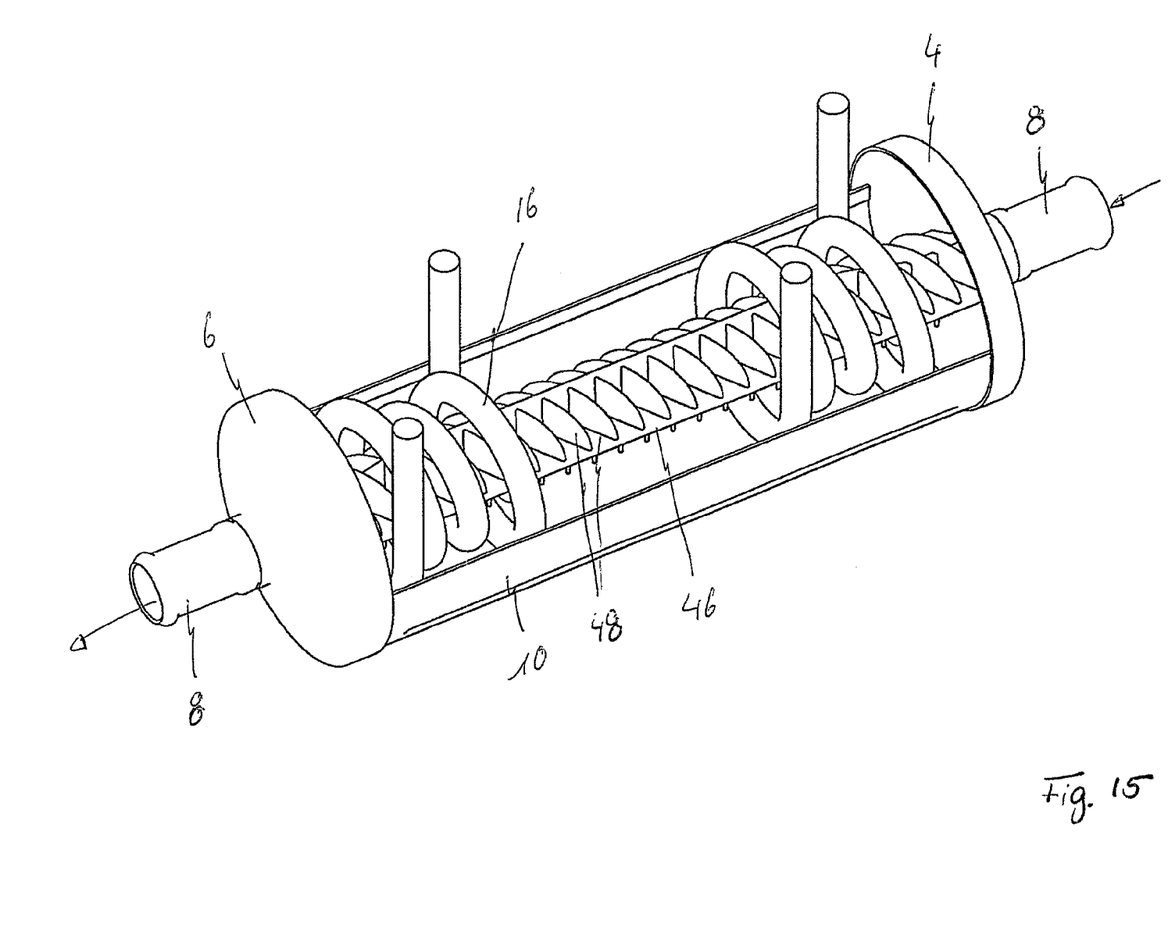
FIG. 15 shows a perspective view of a heater (or auxiliary heater) designed as a water heater according to a second preferred embodiment of the invention provided for attaching an electronics housing.

Hereinafter, a second preferred embodiment of the invention is described by way of the FIGS. 15 to 16a, wherein substantially only the constructional as well as functional differences from the first preferred embodiment are to be discussed, whereas the other features (not mentioned in detail) are substantially in conformity with the first embodiment. Therefore, the same reference numerals are used for equal (already described) components According to FIG. 16, for holding (radial supporting) the at least one RHK 16 a central support beam 46 of metallic or plastic material is provided which extends along the helical axis of the at least one RHK 16 and includes a number of preferably plate-shaped radially projecting braces or ribs 48 adapted to be adjacent substantially locally to the inner circumference of the RHK. Concretely speaking, the plate-shaped ribs 48 preferably consisting of metal or plastic material are inclined transversely to the longitudinal beam direction and preferably at an angle with respect to the longitudinal beam direction and in this way mainly adopt, the function of flow baffles or swirling elements. The support beam 46 itself has a "+" profile (cross profile) in cross-section so as to achieve maximum flow toward the ribs 48. The radial periphery of the support beam 46 defined by the "+" profile is dimensioned so that the support beam 46 is (locally) adjacent to the inner periphery of the helical RHK and thus supports the same. At the axial end portions 46a, 46b of the support beam 46 the radial dimension of the latter is reduced (while the cross-sectional profile is maintained) so as to be adapted to be inserted into the fluid connections 8 spaced apart in flow direction at the cover lids 4, 6. In this manner, the support beam 46 is held in the connections 8 at the end side.

Figures 16, 16A:
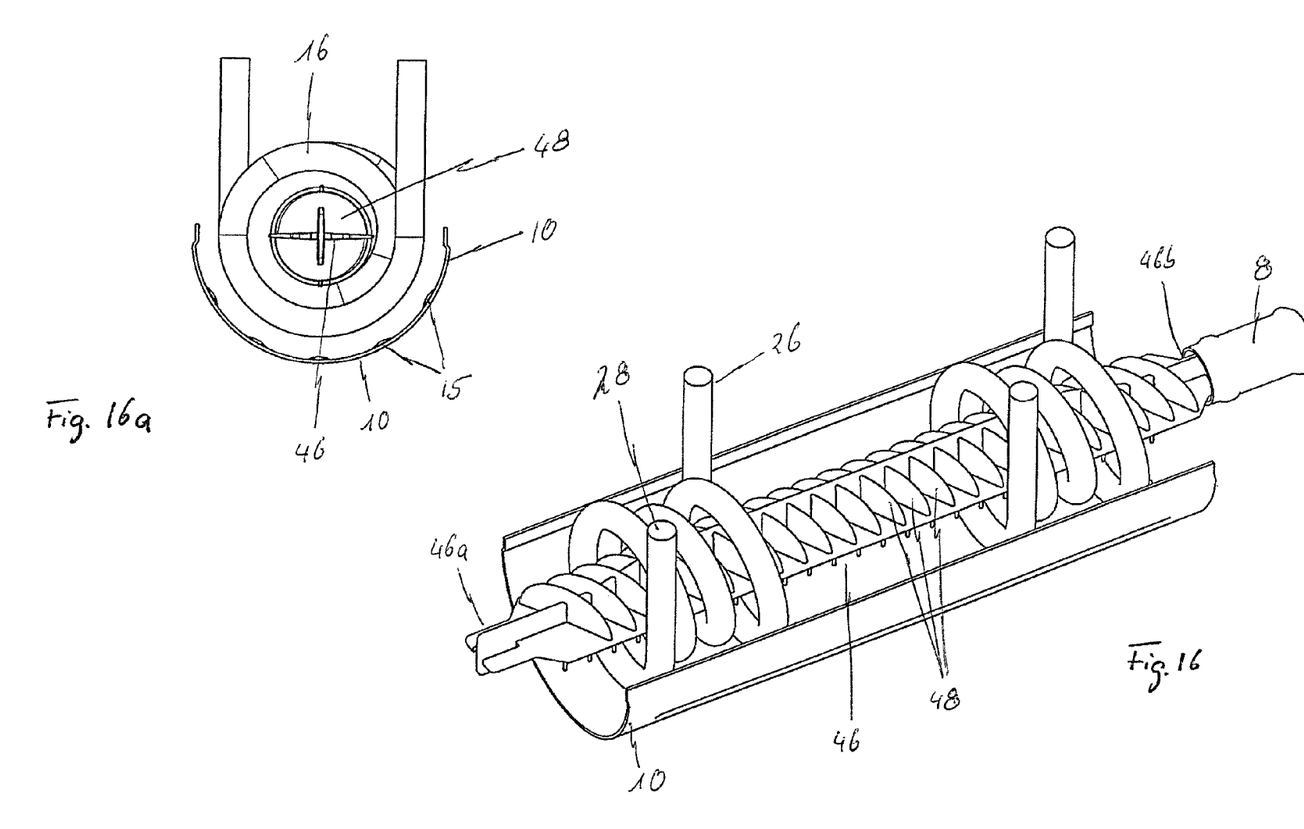
FIG. 16 shows a perspective view of the heater according to FIG. 15 in which the cover lids of the housing are removed.
FIG. 16*a* shows a front view of the heater according to FIG. 16.

As can be further taken from FIG. 16a, at the groove-shaped half shells 10 (and preferably 12) likewise reinforcing ribs 15 are arranged which do not support the RHK 16 at the outer periphery in this second embodiment, however.

The reinforcing ribs 15 can also be designed, however, as is shown in the first embodiment, so that the RHK 16 is clamped so-to-speak between the support beam 16 and the reinforcing ribs 15. The advantages of the heater 1 according to the second preferred embodiment are the same as those of the first preferred embodiment so that the foregoing description can be referred to in this context.

Figure 17:
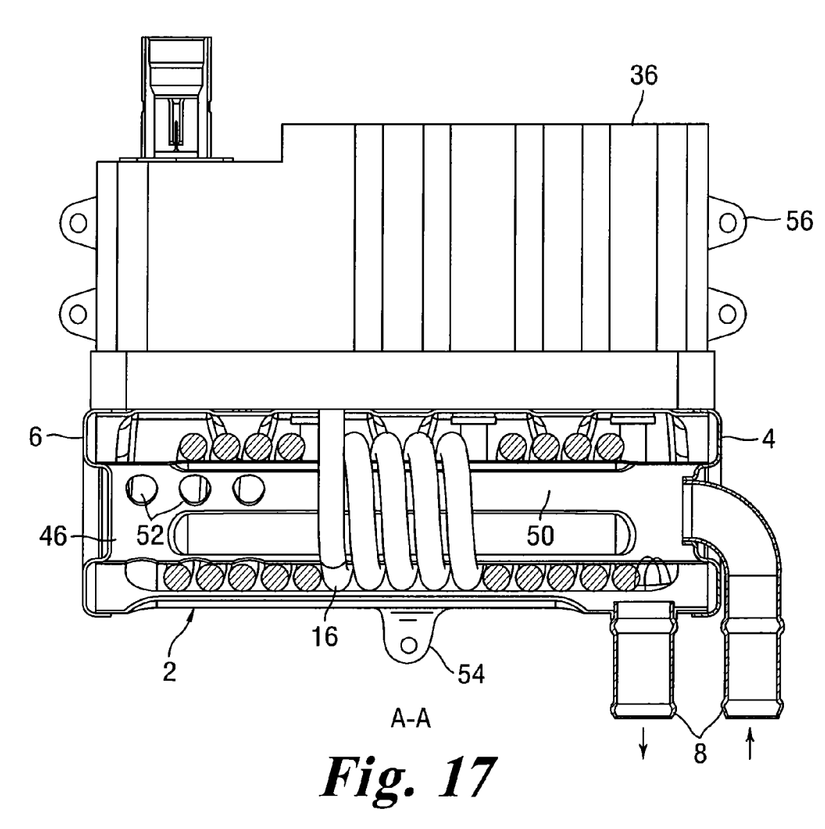
FIG. 17 shows a longitudinal section of a heater according to a third preferred embodiment of the invention.

Finally a third preferred embodiment of the invention is described by way of FIG. 17, wherein substantially only the constructional and functional differences from the second preferred embodiment shall be discussed, whereas the other features (not mentioned in detail) are substantially in conformity with the first and second embodiments. Therefore, the same reference numerals are used for equal (already described) components.

According to the third preferred embodiment of the invention (see FIG. 17), in contrast to the second embodiment the support beam 46 does not consist of a "+" profile but of a tubular member (metal, aluminum or plastic material) which is attached (welded, soldered or slipped on) at its axial ends to the respective cover lids 4, 6. One cover lid 4 is provided with the inlet connection 8 (this time in a 90° offset form), whereas the other cover lid 6 is in the form of a blind plug in the present case so as to close the tubular member at the end side. Instead, another fluid connection 8 (serving as outlet) is provided on the jacket side in the housing 2 especially in a groove-shaped half shell 10, namely on the sides (in the area) of the inlet connection.

The outer periphery of the support beam 46 configured as tubular member is dimensioned so that it is adjacent with the at least one RHK 16 to the inner periphery thereof and radially supports the latter. As an alternative to this, there can also be provided the fact that at the outer periphery of the tubular member axially extending outer strips 50 are arranged on which the RHK 16 are supported at the inside and which optionally adopt flow guiding functions. Moreover, in the tubular member 46 especially on the side (in the area) of the cover lid 6 configured as blind plug a number of radial through bores 52 are formed to connect the interior of the tubular member to the interior of the housing 2 surrounding the latter.

Ultimately, in the third embodiment mounting tabs and potential equalization are separated. Concretely speaking, mounting/fastening tabs 56 are formed at the housing 36 of the electronics, whereas further tabs 54 having a potential equalization function are formed/arranged at the (cylindrical) housing 2 of the heater 1.

Inflowing fluid is thus first guided through the inner tubular member/support beam 46 and then forced through the through bores 52 outwardly into the interior of the housing 2. After that the fluid flows along the outer periphery of the tubular member 46 back to the outlet connection 8 and is heated by the at least one RHK 16. Consequently, this constructional variant enables to arrange the inlet and outlet at the same axial end side of the housing 2 and still to ensure optimum heat transfer to the fluid flowing through.

Figure 17A:
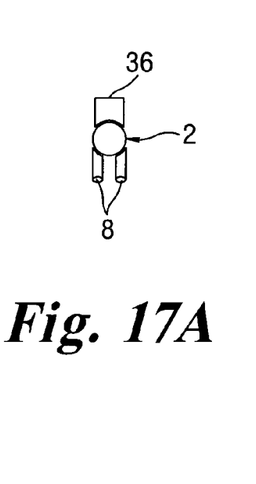
FIG. 17*a* shows an alternative of the third preferred embodiment according to FIG. 17, FIG. 18*a*, 18*b* show characteristic curves of resistance heating elements

It is finally referred to the fact that in the third embodiment of the invention according to FIG. 17 the fluid connections 8 are arranged at one axial end portion of the housing 2 so that they form an axial distance from each other. As an alternative or in addition, the two fluid connections 8 may also be arranged at a radial distance from each other at the one end portion of the housing 2, as this is sketched in FIG. 17a.

However, it is decisive to all embodiments to optimize the flow in the component such that a suction of air is safely prevented. This is necessary as the suction of air can form sort of an air chamber in which the heating elements are provided freely without fluid flowing around, which results in local overheating of the tubular heating unit and possibly entails undesired switch-off of the heating unit.

As mentioned in the beginning, the heating coil, for instance in the form of a resistance heating element 20, is made of a material having an approximately linear R-T characteristic curve in an operating temperature range. For the control of the heater 1 hereinafter explained in more detail the knowledge of this characteristic curve is important so that prior to taking the heater 1 into operation a calibration or measurement of the individual characteristic curve should be performed during manufacture.

Figure 18A:
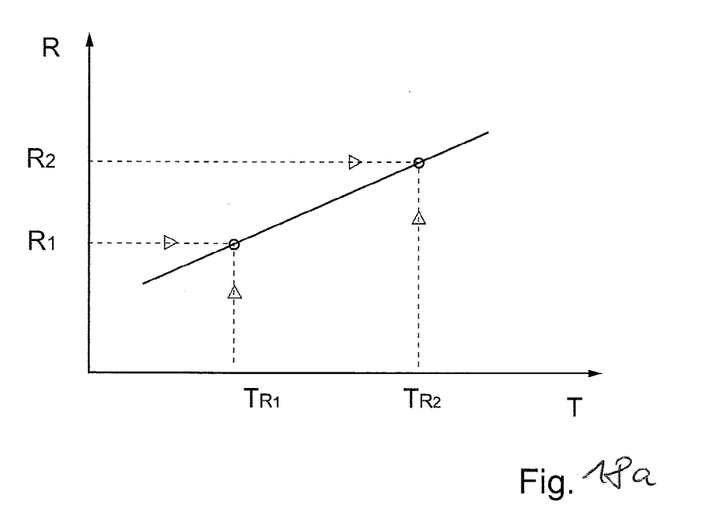

FIG. 18a shows a possibility of measuring such characteristic curve. With two predetermined reference temperatures TR1, TR2 and a predetermined operating voltage (high-voltage, low-voltage) the occurring corresponding resistances R1, R2 of the resistance heating element 20 are detected and then, based on these two observational pairs, the characteristic curve assumed to be linear according to FIG. 18a which extends through the two observational pairs is determined. In this way, the characteristic curve for each resistance heating element 20 can be determined so that manufacturing inaccuracies and material variations can be compensated by this calibration of each resistance heating element 20.

The thus measured characteristic curves are then stored in a data memory of the power electronics.

In the afore-described calibration method at least two measurements must be carried out for each resistance heating element.

Figure 18B:
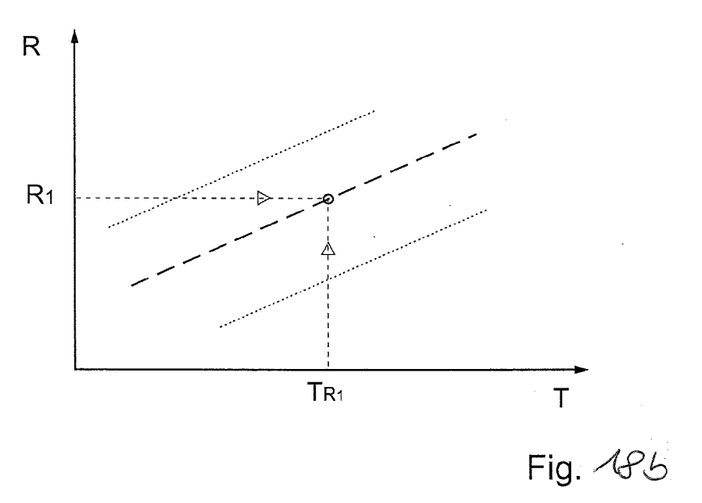

FIG. 18b shows a simplified calibration in which merely one single measurement is required for determining the same on the assumption that the gradient of the characteristic curve remains constant even in the case of manufacturing and material variations and only a parallel shift of the characteristic curves is performed. That is to say, with a predetermined reference temperature TR1 the occurring resistance of the resistance heating element is established so that, with an equally predetermined gradient, the actual characteristic curve (in broken lines in FIG. 18b) can then be determined and stored in the data memory of the power electronics.

Figure 19:
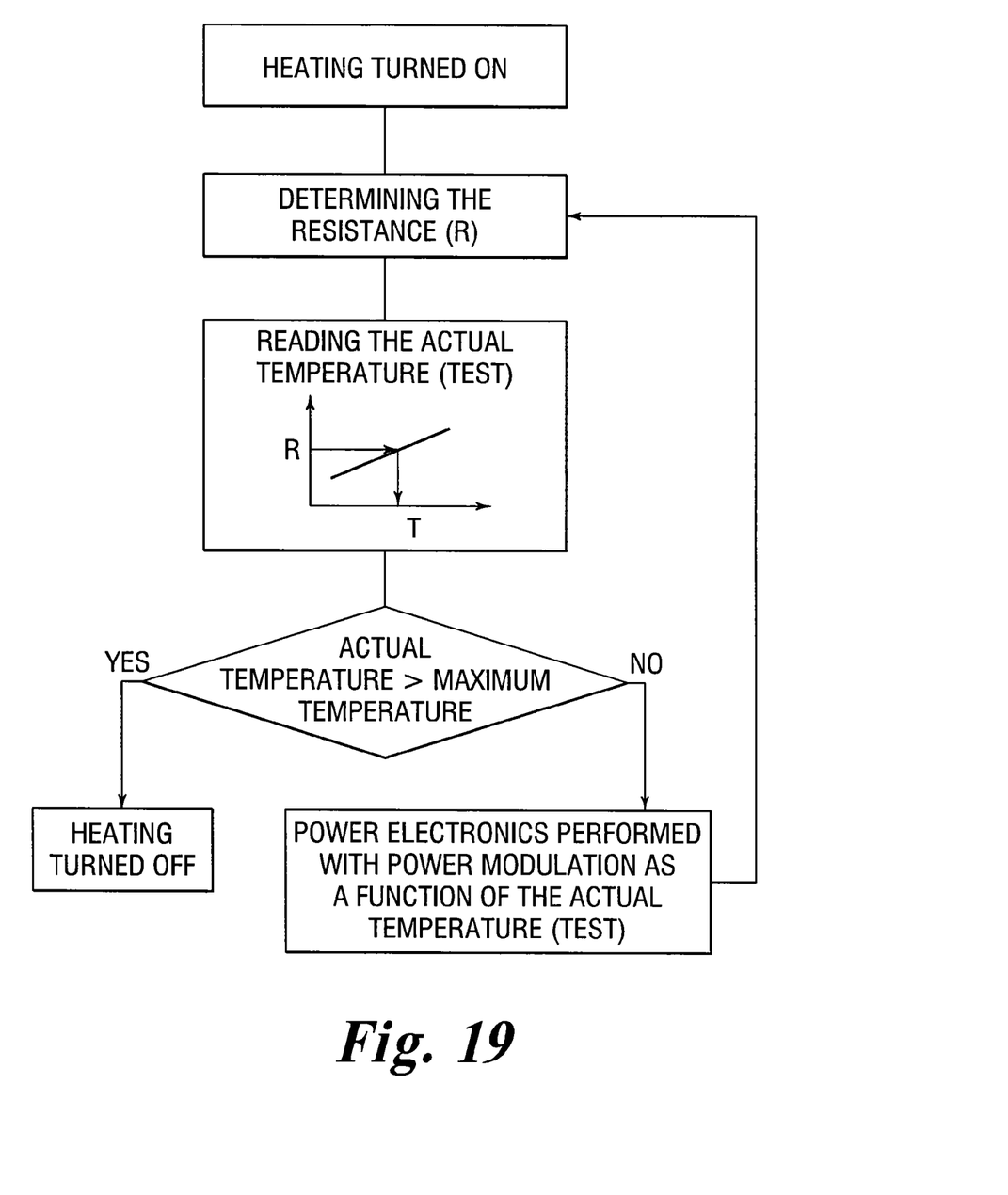
FIG. 19 shows a strongly simplified process diagram of controlling a heater.

With the knowledge of said characteristic curves, the heater 1 is then controlled in accordance with the strongly simplified flow chart of FIG. 19.

When starting the vehicle the heater is switched on for heating the air flow initially with full power or according to the requirements of the air-conditioning control with reduced power, for instance with several heating circuits being switched off In the case of an appropriate design, also a current measurement can be performed via a switch or control element which controls the respective heating circuit and is built on a printed circuit board so that, in response to the predetermined vehicle voltage (high-voltage, low-voltage) and the measured current, the resistance of the resistance heating element 20 can be determined.

In response to this resistance, an actual temperature $T_{IST}$ is read out of the stored characteristic curve of the resistance heating element 20 and this temperature of the resistance heating element 20 is compared to a maximum temperature $T_{Max}$ stored in the power electronics.

In case that the actual temperature exceeds the predetermined maximum temperature the heater 1 is switched off or at least one of the heating circuits is disconnected.

In case that the actual temperature is below the maximum temperature, a power modulation is carried out through the power electronics in response to the actual temperature so as to optimize the heating of the air flow, wherein with sufficient power application the electric power supplied to the individual heating circuits can be reduced and/or individual heating circuits can be disconnected so that the load of the heater 1 is constantly reduced to an optimum at which minimum consumption is accompanied by sufficient heating of the air flow.

In the shown embodiment a material having a low PTC characteristic is used for the resistance heating element 20. However, said PTC effect is by no means comparable to that of a true PTC resistor, but it is sufficient to determine the temperature of the heating element in response to the resistance.

The electric heater according to the invention includes a fluid-guiding housing in which at least one preferably helical heating unit, more preferably a resistance heating element is accommodated. The heating unit can have a tubular outer body in which a heating element electrically contacted with a control circuit accommodated in an electronics housing is embedded. According to an aspect of the invention, end sections of the helical heating unit are guided in a sealed manner through the fluid-guiding housing to and preferably into an electronics housing. According to another (preferably independent) aspect of the invention, the electronics housing is held by a support at the housing through which fluid flows, wherein the support simultaneously also forms a fastening means of the heater for mounting to a supporting component preferably provided at the body side.

Furthermore, a method of controlling an electric heater and a heater operable in accordance with such method are disclosed, wherein said heater is designed to include at least one resistance heating element which itself acts as thermal sensor so that the temperature thereof can be used to control the heater.

LIST OF REFERENCE NUMERALS

1 Heater
2 cylindrical housing
4, 6 cover lid
8 fluid connections
10, 12 groove-shaped half shells
14 heating means/device
15 reinforcing ribs
16 tubular heating unit
18 tube/jacket-shaped outer body
20 heating coil
22, 24 axial end (sections) of the heating coil
26, 28 axial ends of the heating unit
30, 32 through orifices in the housing
34 mounting tabs/potential equalization
36 electronics housing
38 strip-shaped holding elements
40 housing guides
42 ground contact feet
44 through bores
46 support beams
46a, 46b axial end sections of the beam
48 ribs
50 outer strips
52 through bores
54 potential equalization (tab)
56 fastening/mounting tab

The invention claimed is:

1. An electric heater for heating a fluid in a vehicle comprising
a fluid-guiding housing configured to guide fluid flowing through said fluid-guiding housing,
at least one heating unit comprising a wire resistance heating element accommodated in the fluid-guiding housing, and
an electronics housing,
wherein
end sections of the heating unit are guided in a sealed manner through the fluid-guiding housing into the electronics housing,
the heating unit is configured as a tubular heating body including a tubular outer body, a heating element being embedded in said tubular outer body and being electronically contacted with a control circuit accommodated in the electronics housing, wherein a clearance is formed between the tubular outer body and the heating element, said clearance being filled with an insulator, the outer diameter of the heating element being smaller than the inner diameter of the outer body,
wherein free end sections of the heating unit extend essentially radially through through-borings of the fluid-guiding housing and protrude to the electronics housing, and
wherein the end sections of the heating unit are guided out of the fluid-guiding housing at an angle to a through-flow direction.

2. The electric heater according to claim 1, wherein the end sections of the heating unit are guided out of the fluid-guiding housing approximately transversely to the through-flow direction.

3. The electric heater according to claim 1, wherein the heating unit is supported in a flow-around direction by holding elements arranged at at least one of the peripheral side and the inside.

4. The electric heater according to claim 3, wherein the holding elements are holding sheets or strips spaced in circumferential direction of the heating unit that extend in parallel to the winding axis of the heating unit and are in holding engagement with the heating unit.

5. The electric heater according to claim 3, wherein the holding elements comprise a central support beam extending along the winding axis of the heating unit and at the inside supporting the heating unit, wherein a number of radial plates or ribs spaced in longitudinal beam direction are arranged at the support beam that form flow baffles.

6. The electric heater according to claim 5, wherein the support beam has a "+" shaped cross-section and is inserted at its axial end section in inlets and outlets of the fluid-guiding housing spaced in flow direction.

7. The electric heater of claim 1, wherein the fluid-guiding housing includes a first groove-shaped shell member supporting the heating unit, a second shell member complementary to the first shell member, and two front-side housing end portions each having a fluid inlet or fluid outlet.

8. The heater according to claim 1, wherein housing parts are connected by welding, soldering or gluing.

9. The heater according to claim 1, wherein the fluid-guiding housing has a cylindrical shape.

10. The heater according to claim 1, comprising a power electronics configured to control at least one heating circuit and having a data memory for storing an R-T characteristic curve, the power electronics being designed for establishing an actual resistance and for reading out an actual temperature in response to the actual resistance and for controlling a resistance heating element in response to the actual temperature.

11. The heater according to claim 10, wherein a control element of the power electronics for switching or controlling the resistance heating element is also designed for measuring a current intensity.

12. The electric heater according to claim 5, wherein the flow baffles are arranged for swirling the fluid flow.

\* \* \* \* \*